(12) United States Patent
Schönebeck

(10) Patent No.: US 7,140,676 B2
(45) Date of Patent: Nov. 28, 2006

(54) VEHICLE BODY PANEL PART, PARTICULARLY VEHICLE ROOF PANEL

(75) Inventor: Horst Schönebeck, Gelnhausen (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 11/221,628

(22) Filed: Sep. 8, 2005

(65) Prior Publication Data

US 2006/0055212 A1  Mar. 16, 2006

(30) Foreign Application Priority Data

Sep. 15, 2004 (DE) ............ 10 2004 044 670

(51) Int. Cl.
    B60J 7/043 (2006.01)
(52) U.S. Cl. .................. 296/216.09; 296/187.02
(58) Field of Classification Search ........ 296/216.09, 296/187.02
    See application file for complete search history.

(56) References Cited

U.S. PATENT DOCUMENTS

| | | | | |
|---|---|---|---|---|
| 3,620,864 A | * | 11/1971 | Heffner ............ | 156/79 |
| 3,710,440 A | * | 1/1973 | Nevin et al. ...... | 29/828 |
| 4,240,850 A | * | 12/1980 | Arntz ............. | 156/78 |
| 4,351,365 A | * | 9/1982 | Bauermeister et al. | 138/149 |
| 6,272,809 B1 | * | 8/2001 | Wycech ............ | 52/731.6 |
| 6,273,500 B1 | * | 8/2001 | Boersma et al. .... | 296/216.09 |
| 2002/0021029 A1 | * | 2/2002 | Bohm et al. ....... | 296/211 |
| 2004/0105960 A1 | * | 6/2004 | Kennedy ........... | 428/188 |

FOREIGN PATENT DOCUMENTS

| | | |
|---|---|---|
| DE | 19637793 | 11/1997 |
| DE | 100 39 522 A1 | 2/2002 |
| DE | 203 16 000 U1 | 1/2004 |
| EP | 0598352 | 11/1993 |
| EP | 0 978 399 A | 2/2000 |

OTHER PUBLICATIONS

European Search Report, Feb. 1, 2006.

* cited by examiner

Primary Examiner—Dennis H. Pedder
(74) Attorney, Agent, or Firm—Carlson, Gaskey, & Olds

(57) ABSTRACT

The invention relates to a vehicle body panel part, particularly a vehicle roof panel, which has a very good surface quality. The vehicle body panel part includes an outer part forming at least a portion of an outer skin, a plastic inner layer formed by back foaming on a rear side of the outer part, and at least an elongated, tubular hollow body that is embedded in the plastic inner layer. The hollow body is completely enclosed and surrounded by the inner layer.

11 Claims, 3 Drawing Sheets

VEHICLE BODY PANEL PART, PARTICULARLY VEHICLE ROOF PANEL

BACKGROUND OF THE INVENTION

The application claims priority to German Application No. 10 2004 044 670.9, which was filed on Sep. 15, 2004.

The invention relates to a vehicle body panel part, particularly to a vehicle roof panel, having an outer part defining at least a portion of an outer skin, an inner layer formed on a rear side of the outer part, and an elongated, tubular hollow body embedded in the inner layer.

Body panel parts for a vehicle are parts that are mounted to a vehicle body to define, at least in sections, an outer skin of the vehicle in a final assembled state, and which are visible from outside the vehicle. Body panel parts may be flaps (doors, covers), bumpers or roof modules. Roof modules include vehicle roof panels or covers for roof opening systems.

It is already known to produce foamed vehicle body panel parts such as roof modules or flaps from plastic, such as a glass fiber-reinforced polyurethane (PU) material for example. Glass fiber portions are introduced in the plastic by a long fiber injection (LFI) method, for example.

Document DE 196 37 793 C1 discloses a glass cover of a roof opening system which is back foamed with PU material, with filling bodies being encased in foam and completely consisting of polyurethane, polystyrene or plastic. An open profile, which is also encased in foam, is intended to contribute to the reinforcement. Glass fiber portions are not included in the PU material.

EP 0 598 352 B1 discloses elongated and upwardly open insert pieces of a glass cover of a roof opening system that are embedded in the back foaming. These insert pieces are inserted in a biased state and thus stiffen the glass cover. This provides a desired curvature in a simple manner.

Due to different material strengths of an inner layer and the associated different expansion and shrinking behavior in certain sections of the vehicle body panel parts, an impairment of the surface quality can occur in the vehicle body panel parts.

SUMMARY OF THE INVENTION

The invention provides a vehicle body panel part that has a very good surface quality. The vehicle body panel part includes an outer part defining at least a portion of an outer skin, an inner layer of plastic formed by back foaming on a rear side of the outer part, and at least an elongated tubular hollow body embedded in the inner layer. The hollow body is substantially enclosed and surrounded by the inner layer. Preferably, the hollow body is completely enclosed and surrounded by the inner layer.

The advantages achieved with the invention particularly are that different expansion and shrinking behavior of back foaming material is prevented by inserting the hollow body in such a manner that PU foam can not enter the hollow body. The body panel part is stiffened by the hollow body and a quantity of liquid plastic in a region of the hollow body is reduced such that a lower expansion and a lower shrinking is achieved than would be the case without a hollow body. In this way, impairments of the surface quality are prevented. Since the inner layer completely surrounds the hollow body, the hollow body is reliably embedded in the inner layer and reinforces the body panel part in all directions.

Preferably, the hollow body is a hollow profile closed by separate closure bodies on end faces. Since the hollow profile is closed, PU material can not enter into the hollow profile during the back foaming process, which prevents the partially different volume shrinkage.

Preferably, the hollow body is distanced from the outer part by spacers in order to generate an exact, reproducible distance.

The closure body may have projecting prolongations that protrude in the inner layer and thus fix the closure body. The prolongations preferably extend to the outer part and to an outer face of the inner layer. Thus, the prolongations ensure a reliable fixation of the hollow body in a foaming mold during back foaming.

Preferably, the complete space between the outer part and the hollow body extending along the entire length of the hollow body is filled by the inner layer. This improves the stability.

Preferably, the inner layer extends to an edge of the outer part and at least partially covers side faces of the outer part. More preferably, the inner layer completely circumscribes the outer part at the side faces.

The hollow body preferably comprises a rigid outer wall made of metal, for example.

The body panel part is preferably a cover for a roof opening system. The roof opening system may be a sliding-tilt roof, in which the cover is moved below a solid roof skin when the cover is moved back. The roof opening system may also be a spoiler roof, in which the cover is shifted over the solid roof skin. The cover is particularly a glass cover.

Preferably, the hollow body extends transversely to a longitudinal direction of the vehicle, and correspondingly to a longitudinal side of the cover.

These and other features of the present invention can be best understood from the following specification and drawings, the following of which is a brief description.

DETAILED DESCRIPTION OF THE PREFERRED EMBODIMENT

Figure 1:
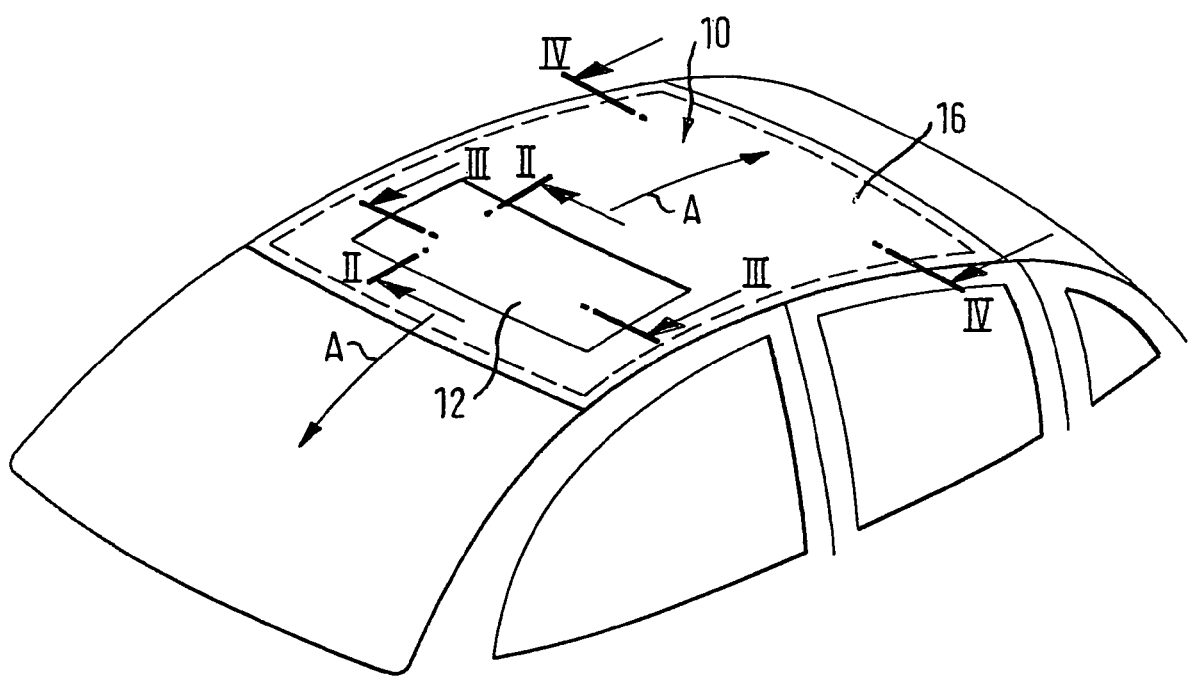
FIG. 1 illustrates a schematic perspective view of a vehicle roof having a vehicle body panel part according to the invention in the form of a vehicle roof panel.
Figure 2:
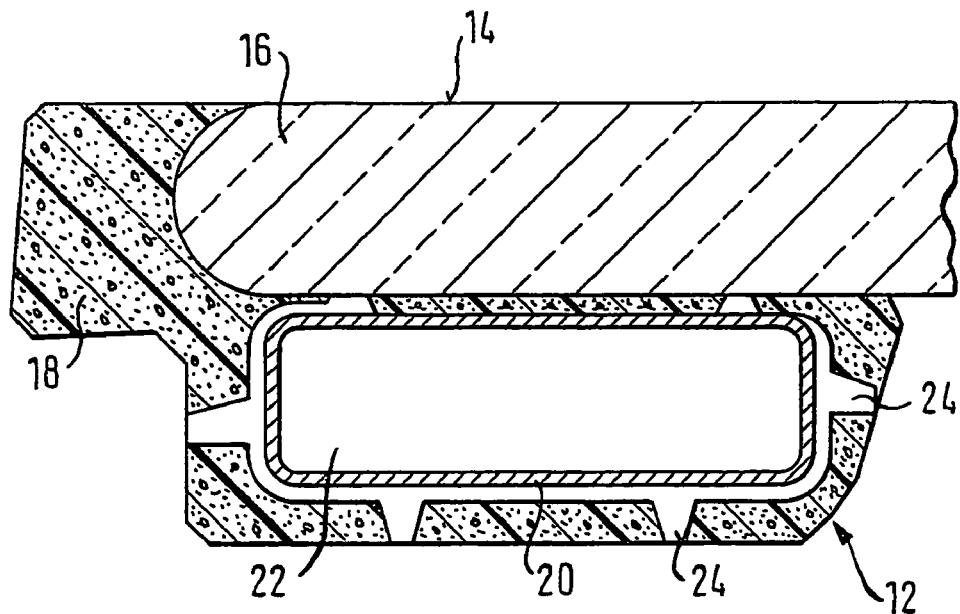
FIG. 2 illustrates an enlarged sectional view through the vehicle body panel part along the line II—II in FIG. 1.
Figure 3:
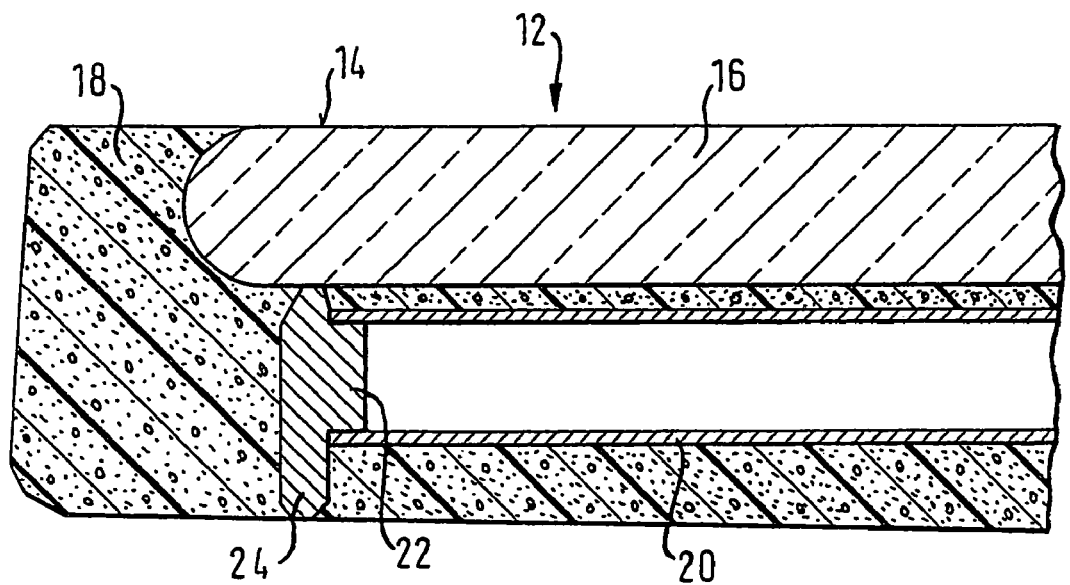
FIG. 3 illustrates an enlarged sectional view through the vehicle body panel part along the line III—III in FIG. 1.

FIG. 1 shows a vehicle body panel part in the form of a vehicle roof panel. The vehicle roof panel may be a roof module 10 (FIG. 4) or a cover 12 with an openable vehicle roof (FIGS. 2 and 3).

In the following, the embodiment in FIG. 2 and FIG. 3 will be described in detail. As already mentioned, the vehicle roof panel here is formed by a movable cover 12 that can be raised. The cover 12 also forms a part of an outer skin of the vehicle when the cover 12 closes a roof opening. The outer skin is that part of the vehicle that is visible from outside the vehicle when the roof opening is closed. The cover 12 has an outer face 14 that partially defines the outer skin and represents an upper side of the cover 12.

The cover 12 has an outer part 16 in the form of a glass panel that is back foamed with PU material. This PU material forms an inner layer 18. In the embodiment shown, the inner layer 18 is configured such that the inner layer 18 also partially projects laterally upwards over an outer border of the outer part 16 and also forms at the outer border a part of the outer face 14 of the cover 12. The inner layer 18 extends over side edges of the outer part 16 to cover rounded side faces of the outer part 16.

There are no glass fiber portions introduced in the inner layer 18, at least not in the embodiment shown. Here, hollow bodies 20 extending transversely to a longitudinal direction of the vehicle, which is shown as axis A—A in FIG. 1, are embedded in the inner layer 18 in order to stiffen the cover 12. The hollow bodies 20 are arranged completely below the outer part 16, which is formed as a glass panel.

The hollow bodies 20 are hollow profiles (such as tubes, for example) having a rigid outer wall of metal that is completely closed by closure bodies 22 on end faces such that no plastic can enter the hollow body 20 during the back foaming. The closure bodies 22 may be made of plastic and can have grooves or notches so that the closure bodies 22 remain reliably mounted to the hollow body 20 under at the pressure resulting from the back foaming to close the hollow body 20.

The closure bodies 22 further include prolongations 24 that extend to a rear side of the outer part 16 on one hand and to a rear face of the inner layer 18 on the other hand. As shown, the prolongations 24 are conically tapered from the hollow bodies 20. This permits placement of the closure bodies 22, as well as the hollow body 20, in a foaming or injection tool for fastening and fixing the closure bodies 22 and hollow body 20 therein. The prolongations 24 act as spacers for the hollow body 20. Thus, the prolongations 24 extend into the inner layer 18, as shown in FIGS. 2 and 3, whereby the closure bodies 22 and the hollow body 20, which is positively connected to the closure bodies 22, are reliably embedded in the inner layer 18. Here, each hollow body 20 is completely enclosed by the inner layer 18 so that the hollow body 20 forms in all directions a composite with the inner layer 18 and stiffens the cover 12. The complete space between the rear side of the outer part 16 and the hollow body 20 is filled by the inner layer 18 along an entire length of the hollow body 20.

Figure 4:
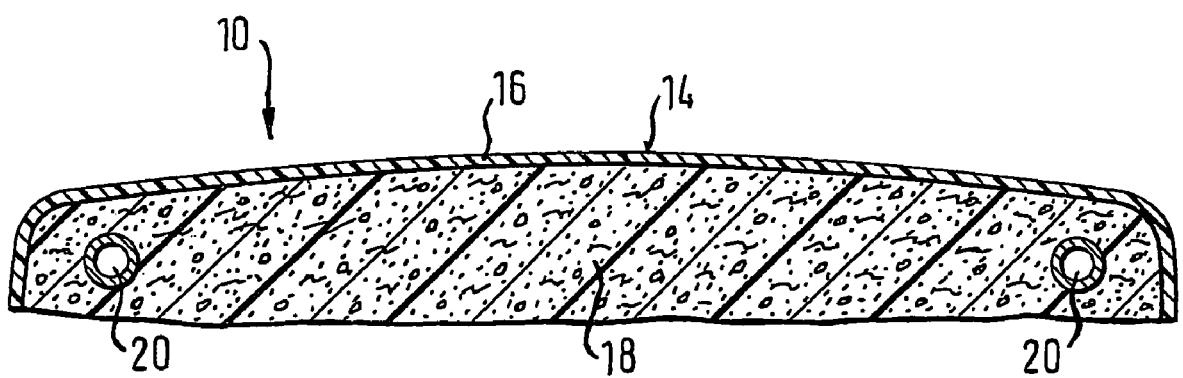
FIG. 4 illustrates a sectional view through the vehicle body panel part in a second embodiment along the line IV—IV in FIG. 1.

In the embodiment according to FIG. 4, the vehicle body panel part is a roof module 10. The outer part 16 is defined by a double-layered coextrusion foil, which forms in sections the outer skin of the vehicle and is plastically deformed by deep-drawing. The double-layered coextrusion foil is further imbued so that an external lacquering of the roof module 10 can be omitted. As in the embodiment of FIGS. 2 and 3, the outer part 16 is back foamed as shown in FIG. 4. The back foaming leads to the formation of an inner layer 18 of PU material. Glass fiber portions are introduced in the PU material by the LFI method for stabilization.

In the embodiment according to FIG. 4, the hollow body 20 is provided with a round cross-section. The hollow body 20 also is comprised of metal and is closed by closure bodies 22 (not shown in FIG. 4) on end faces. The closure bodies 22 are formed as described above with regard to FIGS. 2 and 3 and have the same function. Here, the closure bodies 22 also comprise prolongations (not shown in FIG. 4), which however correspond to the prolongations of the first embodiment and have the same function.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle body panel part comprising:
   an outer part defining at least a portion of an outer skin;
   an inner layer formed by back foaming on a rear side of the outer part;
   at least one hollow body embedded in the inner layer, the at least one hollow body having end faces, wherein the at least one hollow body is substantially enclosed and surrounded by the inner layer to stiffen the vehicle body panel part; and
   separate closure bodies that completely close the at least one hollow body at the end faces, the separate closure bodies comprising prolongations projecting into the inner layer and extending to contact the outer part and extending to an outer face of the inner layer to define areas of an outer face of the vehicle body panel.

2. The vehicle body panel part according to claim 1 including a space between the outer part and the at least one hollow body extending along an entire length of the at least one hollow body, the space being filled with the inner layer, wherein the inner layer is a polyurethane material with glass fibers being embedded within the polyurethane material.

3. The vehicle body panel part according to claim 1 wherein the inner layer at least partly covers a side face of the outer part.

4. The vehicle body panel part according to claim 1 wherein the at least one hollow body comprises a rigid outer wall.

5. The vehicle body panel part according to claim 1 wherein the vehicle body panel part is a cover for a roof opening system.

6. The vehicle body panel part according to claim 5 wherein the at least one hollow body extends transversely relative to a longitudinal side of the cover.

7. The vehicle body panel part according to claim 1, wherein the inner layer comprises a plastic inner layer and the at least one hollow body comprises an elongated, tubular hollow body that is embedded within the plastic inner layer.

8. The vehicle body panel part according to claim 1, wherein the at least one hollow body is completely enclosed and surrounded by the inner layer.

9. The vehicle body panel part according to claim 8, wherein the at least one hollow body comprises a tubular hollow body that is completely enclosed by the separate closure bodies on each end face of the tubular hollow body.

10. The vehicle body panel part according to claim 1 wherein the outer face of the vehicle body panel comprises an outermost underside surface of the vehicle body panel.

11. The vehicle body panel part according to claim 1 wherein the outer part includes an upper surface that comprises a visible outer skin and a lower surface facing a vehicle interior, and wherein the prolongations extend to contact the lower surface of the outer part.

* * * * *